(12) United States Patent
Carlen et al.

(10) Patent No.: US 7,971,487 B2
(45) Date of Patent: Jul. 5, 2011

(54) LINEAR POSITION TRANSDUCER WITH WIRELESS READ HEAD

(75) Inventors: Eric T. Carlen, Roanoke, VA (US); David G. Roberson, Christiansburg, VA (US); Hiep T. Bui, Roanoke, VA (US)

(73) Assignee: Carlen Controls, Inc., Roanoke, VA (US)

( * ) Notice: Subject to any disclaimer, the term of this patent is extended or adjusted under 35 U.S.C. 154(b) by 415 days.

(21) Appl. No.: 12/114,675

(22) Filed: May 2, 2008

(65) Prior Publication Data

US 2009/0271998 A1  Nov. 5, 2009

(51) Int. Cl.
*G01B 7/16* (2006.01)

(52) U.S. Cl. .......................................... 73/760
(58) Field of Classification Search .............. 73/760
See application file for complete search history.

(56) References Cited

U.S. PATENT DOCUMENTS

| | | |
|---|---|---|
| 3,533,703 A | 10/1970 | Wingate |
| 3,898,555 A | 8/1975 | Tellerman |
| 4,028,619 A | 6/1977 | Edwards |
| 4,071,818 A | 1/1978 | Krisst |
| 4,140,044 A | 2/1979 | Biller et al. |
| 4,144,519 A | 3/1979 | Chamuel |
| 4,144,574 A | 3/1979 | Chamuel |
| 4,208,142 A | 6/1980 | Chu |
| 4,229,883 A | 10/1980 | Kobashi |
| 4,252,176 A | 2/1981 | Page |
| 4,298,861 A | 11/1981 | Tellerman |
| 4,319,189 A | 3/1982 | Cullum, Jr. et al. |
| 4,349,285 A | 9/1982 | Gernelle |
| 4,413,892 A | 11/1983 | Lambeth |
| 4,494,588 A | 1/1985 | Berry et al. |
| 4,506,714 A | 3/1985 | Shrum et al. |
| 4,529,021 A | 7/1985 | Shrum et al. |
| 4,530,161 A | 7/1985 | Blankinship |
| 4,543,649 A | 9/1985 | Head et al. |
| 4,557,304 A | 12/1985 | Shrum |
| 4,622,517 A | 11/1986 | Arnaud et al. |
| 4,654,590 A | 3/1987 | Kitaura et al. |
| 4,708,180 A | 11/1987 | Browning, Jr. et al. |
| 4,709,210 A | 11/1987 | Pond |
| 4,721,902 A | 1/1988 | Tellerman et al. |
| 4,726,226 A | 2/1988 | Tellerman |
| 4,757,747 A | 7/1988 | Blatter et al. |

(Continued)

*Primary Examiner* — Lisa M Caputo
*Assistant Examiner* — Octavia Davis
(74) *Attorney, Agent, or Firm* — Sterne, Kessler, Goldstein & Fox P.L.L.C.

(57) ABSTRACT

A linear position transducer reliably and wirelessly tracks rapid motion. The transducer includes a scale, a control head, and a wirelessly-powered read head disposed proximate to the scale. The read head is configured to sense movement between the scale and the read head and to wirelessly communicate position data to the control head. The control head can include a wireless data receiver to receive position data from the read head, an output data driver to communicate with an external device, and a microcontroller to coordinate a data transfer between the wireless data receiver and the output data driver. In addition, the read head can include a wireless data transmitter to transmit position data to the control head, a linear position sensor to sense position along the scale, and a microcontroller to calculate a position measurement from the scale. The microcontroller in the read head can also coordinate a data transfer between the wireless data transmitter and the control head. To provide a complete wireless solution, the linear position transducer also includes a power system to wirelessly transfer energy from the control head to the read head.

19 Claims, 19 Drawing Sheets

U.S. PATENT DOCUMENTS

| | | | |
|---|---|---|---|
| 4,803,427 A | 2/1989 | Mason et al. | |
| 4,830,685 A | 5/1989 | Masumoto et al. | |
| 4,839,590 A | 6/1989 | Koski et al. | |
| 4,839,833 A | 6/1989 | Parhiskari | |
| 4,893,077 A * | 1/1990 | Auchterlonie | 324/207.17 |
| 4,931,729 A | 6/1990 | Pratt | |
| 4,939,457 A | 7/1990 | Tellerman | |
| 4,943,773 A | 7/1990 | Koski et al. | |
| 4,950,988 A | 8/1990 | Garshelis | |
| 4,952,873 A | 8/1990 | Tellerman | |
| 4,958,332 A | 9/1990 | Tellerman | |
| 4,961,267 A | 10/1990 | Herzog | |
| 5,003,260 A * | 3/1991 | Auchterlonie | 324/207.16 |
| 5,017,867 A | 5/1991 | Dumais et al. | |
| 5,043,685 A | 8/1991 | Nyce | |
| 5,047,676 A | 9/1991 | Ichikawa | |
| 5,050,430 A | 9/1991 | Begin et al. | |
| 5,076,100 A | 12/1991 | Hunter et al. | |
| 5,115,195 A | 5/1992 | Peterson et al. | |
| 5,150,049 A | 9/1992 | Schuetz | |
| 5,172,485 A | 12/1992 | Gerhard et al. | |
| 5,206,586 A | 4/1993 | Yauch et al. | |
| 5,209,106 A | 5/1993 | Carlin | |
| 5,253,522 A | 10/1993 | Nyce et al. | |
| 5,311,124 A | 5/1994 | Hubbard et al. | |
| 5,334,933 A | 8/1994 | Tellerman | |
| 5,347,849 A | 9/1994 | Reeme et al. | |
| 5,354,203 A | 10/1994 | Kotch et al. | |
| 5,367,255 A | 11/1994 | Nyce et al. | |
| 5,412,316 A | 5/1995 | Dumais et al. | |
| 5,471,873 A | 12/1995 | Nyce et al. | |
| 5,473,245 A | 12/1995 | Silvus, Jr. et al. | |
| 5,535,625 A | 7/1996 | Levy | |
| 5,541,507 A | 7/1996 | Ekwall | |
| 5,545,984 A | 8/1996 | Gloden et al. | |
| 5,577,411 A | 11/1996 | Kruzynski et al. | |
| 5,590,091 A | 12/1996 | Gloden et al. | |
| 5,634,398 A | 6/1997 | McGee et al. | |
| 5,640,880 A | 6/1997 | Mulrooney et al. | |
| 5,671,541 A | 9/1997 | Dai et al. | |
| 5,714,881 A | 2/1998 | Begin | |
| 5,717,330 A | 2/1998 | Moreau et al. | |
| 5,736,855 A | 4/1998 | Smith et al. | |
| 5,883,345 A | 3/1999 | Schonauer et al. | |
| 5,923,164 A | 7/1999 | Ehling et al. | |
| 6,058,775 A | 5/2000 | Levy | |
| 6,194,891 B1 | 2/2001 | Begin | |
| 6,208,133 B1 | 3/2001 | Ehling et al. | |
| 6,232,769 B1 | 5/2001 | Brunsch et al. | |
| 6,271,660 B1 | 8/2001 | Sprecher, Jr. | |
| 6,404,183 B1 | 6/2002 | Piana | |
| 6,434,516 B1 | 8/2002 | Topmiller | |
| 6,441,608 B2 | 8/2002 | Brunsch et al. | |
| 6,456,064 B1 | 9/2002 | Dor et al. | |
| 6,480,699 B1 | 11/2002 | Lovoi | |
| 6,495,847 B1 | 12/2002 | Asano et al. | |
| 6,509,733 B2 | 1/2003 | Blubaugh et al. | |
| 6,521,885 B1 | 2/2003 | Miyata | |
| 6,559,636 B1 | 5/2003 | Brunsch et al. | |
| 6,600,310 B2 | 7/2003 | Nyce et al. | |
| 6,612,168 B2 | 9/2003 | Barr et al. | |
| 6,625,517 B1 | 9/2003 | Bogdanov et al. | |
| 6,639,529 B1 | 10/2003 | Jansson | |
| 6,642,509 B2 | 11/2003 | Miyata | |
| 6,668,466 B1 | 12/2003 | Bieg et al. | |
| 6,757,635 B2 | 6/2004 | Topmiller | |
| 6,903,544 B2 | 6/2005 | Kurz et al. | |
| 6,919,779 B2 | 7/2005 | Raphalovitz et al. | |
| 6,969,032 B2 | 11/2005 | Olivera et al. | |
| 7,023,199 B2 | 4/2006 | Blubaugh et al. | |
| 7,024,935 B2 | 4/2006 | Paige et al. | |
| 7,059,238 B2 | 6/2006 | Albright et al. | |
| 7,071,680 B2 | 7/2006 | Kurz et al. | |
| 7,094,978 B2 * | 8/2006 | Skurnik | 178/18.01 |
| 7,121,185 B2 | 10/2006 | Alrefai | |
| 7,310,587 B2 | 12/2007 | Topmiller | |

* cited by examiner

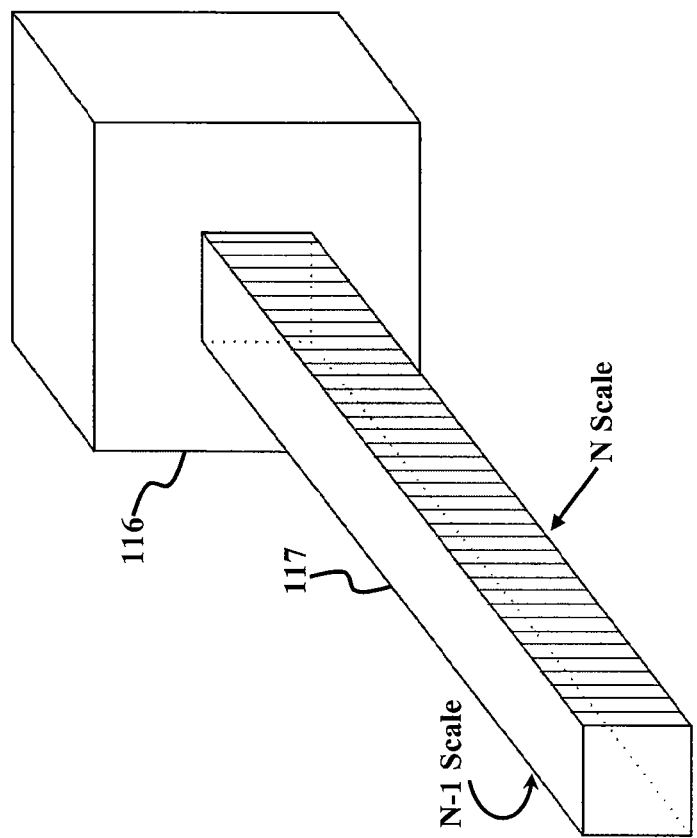
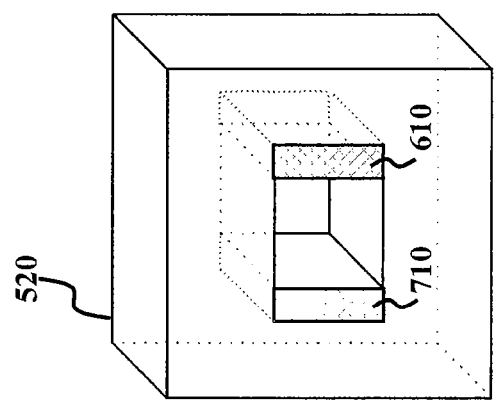
Figure 8

LINEAR POSITION TRANSDUCER WITH WIRELESS READ HEAD

BACKGROUND

1. Field

The present invention generally relates to the field of position sensing and, more particularly, to the field of linear position transducers.

2. Background

Linear position transducers are used in a wide array of position measurement applications including, for example, industrial machines such as injection molding machines, robotic arms, and hydraulic actuators. Generally, linear position transducers can be divided into two categories: (1) stationary read head with moving scale; and (2) moving read head with stationary scale. In the stationary read head category, the read head is typically mounted on a machine frame while the scale is mounted on a moving table. Optical position transducer designs can be configured in this manner, where optical scanning and processor devices are mounted on the machine frame and a scale is mounted on the moving table. In this configuration, as the table moves in relation to the machine frame, the optical scanning device measures the linear position of the table. Current optical position transducer designs can measure linear position down to fractions of a micron.

Other linear position measurement applications require transducers in the moving read head category. In this category, the read head is mounted on a moving table or attached to a moving arm and the scale is mounted on a machine frame. Hydraulic cylinder designs can be configured in this manner, where the read head moves along a rod, in response to a change in pressure of a gas or fluid in a cylinder, and the scale is mounted on a stationary machine frame. In this configuration, conventional hydraulic cylinder designs require a cable attached to the read head to provide power and to obtain an accurate readout of position. For applications requiring a rapidly-moving read head or where cabling introduces undesirable constraint on the read head movement, such conventional designs do not provide a reliable solution.

One commonly used solution for applications requiring a moving read head along a stationary scale is the magnetostrictive sensor. In a magnetostrictive sensor, the position of a magnet moved along a rod can be sensed by sending an interrogation pulse down the rod. Such magnetostrictive sensors are useful for sensors placed in such challenging environments as the interior of hydraulic cylinders. However, their accuracy is limited to about 100 microns per meter.

What is needed is a linear position transducer that can reliably and wirelessly track rapid motion along a scale and provide greater accuracy than conventional sensors, such as the magnetostrictive sensor.

SUMMARY

In order to reliably and wirelessly track rapid motion along a scale, while providing an accurate measurement, a linear position transducer with a wireless read head that moves along the scale can be implemented. In one embodiment of the present invention, the linear position transducer can include a scale, a control head, and a wirelessly-powered read head disposed proximate to the scale. The read head is configured to sense movement between the scale and the read head and to wirelessly communicate position data to the control head. In an example embodiment, the control head includes the following circuit elements: a wireless data receiver to receive position data from the read head; an output data driver to transfer the position data to an external device; and a microcontroller to coordinate a data transfer between the wireless data receiver and the output data driver. Additionally, in this example embodiment, the wirelessly-powered read head includes the following circuit elements: a wireless data transmitter to transmit position data to the control head; a linear position sensor to sense position along the scale; and a microcontroller to calculate a position measurement from the scale and to coordinate a data transfer between the wireless data transmitter and the control head.

The linear position transducer also includes a power system to wirelessly transfer energy from the control head to the read head. In this example embodiment, the power system includes the following circuit elements: a first coil wound around a first ferromagnetic core associated with the scale; a second coil wound around a second ferromagnetic core associated with the read head; and a rectifier circuit coupled to the second coil to convert an AC power signal to a DC power signal. The two coils and their respective ferromagnetic cores act like a transformer to transfer power from the control head to the read head. The power system can also include a voltage regulator to set an appropriate DC voltage level to power the electronic devices in the read head. The scale can include an N scale to measure incremental position. In the alternative, the scale can include both an N scale and an N−1 scale to measure absolute position.

In another embodiment, a method for generating a linear position measurement includes the following steps: wirelessly powering a read head to measure position along a scale; calculating a relative position (whether incremental or absolute) and wirelessly transmitting position data from the read head to a control head. The method can also include communicating the position data received by the control head to an external device. In wirelessly powering the read head, energy can be transferred as described above. Incremental or absolute position can be calculated in the read head or in the control head. If calculations are performed in the control head, position data is transmitted from the read head to the control head. If calculations are performed in the read head, the calculated incremental position and/or absolute position is transmitted from the read head to the control head.

Further embodiments, features, and advantages of the present invention, as well as the structure and operation of the various embodiments are described in detail below with reference to accompanying drawings.

BRIEF DESCRIPTION OF THE DRAWINGS

The accompanying drawings, which are incorporated herein and form part of the specification, illustrate the methods and systems of the invention by way of example, and not by way of limitation. Together with the detailed description, the drawings further serve to explain the principles of and to enable a person skilled in the relevant art(s) to make and use the methods and systems presented herein. In the drawings, like reference numbers indicate identical or functionally similar elements. Further, the drawing in which an element first appears is typically indicated by the leftmost digit(s) in the corresponding reference number (e.g., an element labeled 310 first appears in FIG. 3).

FIG. 8 is an illustration of one embodiment of relative locations of N and N−1 scales and sensors in a three-dimensional view that includes a linear position sensor.

DETAILED DESCRIPTION

In the following description, for purposes of explanation, numerous specific details are set forth in order to provide a thorough understanding of the present invention. It will be evident, however, to one skilled in the relevant art that the present invention can be practiced without these specific details. In other instances, well-known circuits, structures, and techniques are not shown in detail, but rather in a block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
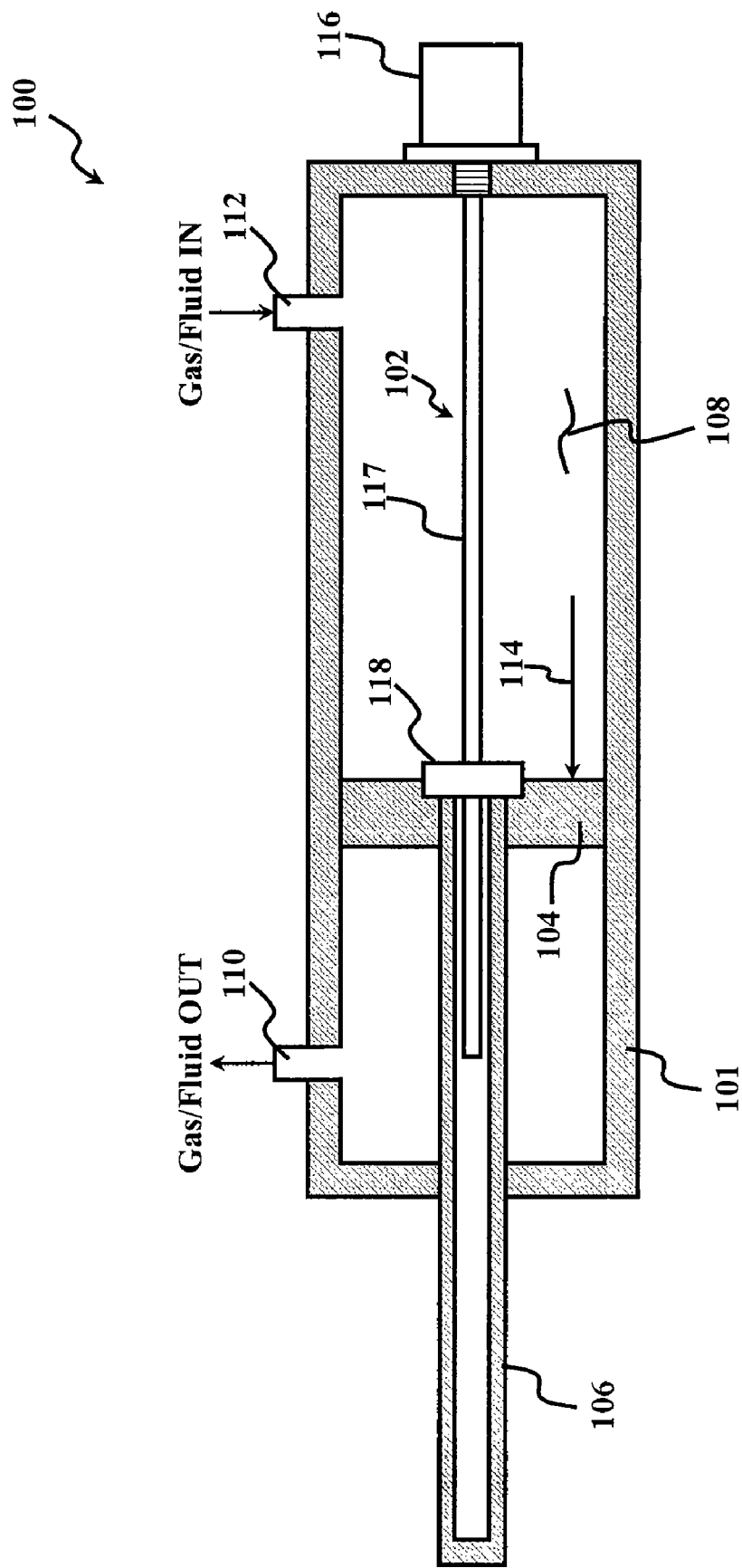
FIG. 1 is an illustration of a linear position transducer in the environment of a hydraulic cylinder.

FIG. 1 is an illustration of a hydraulic cylinder assembly 100 with a linear position transducer 102 disposed therein. Hydraulic cylinder assembly 100 includes a cylinder 101 having a piston 104 and a piston arm 106. In operation, a cavity 108 of cylinder 101 can be filled with a gas or fluid via in/out ports 110 and 112. Differences in pressure between the portions of cavity 108 on each side of piston 104 apply a pressure which will move piston 104 within cavity 108. For example, if fluid is forced into cavity 108 via port 112, it will exert a net force 114 on piston 104, causing piston 104 (and attached piston arm 106) to move.

Figure 2:
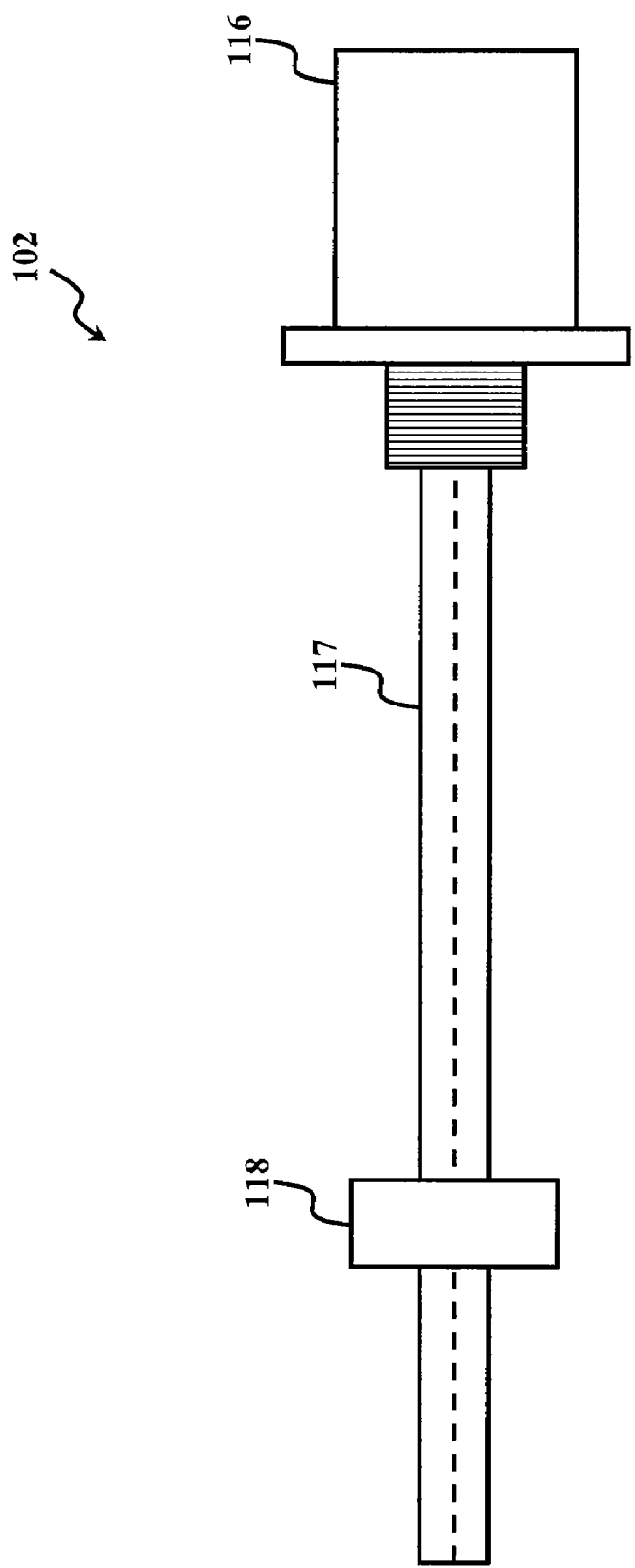
FIG. 2 is an illustration of one embodiment of a linear position transducer.

FIG. 2 is an illustration of one embodiment of linear position transducer 102. Linear position transducer 102 includes a control head 116, a scale rod 117 (referred to herein as a rod, scale rod, or scale), and a wireless read head 118. In hydraulic cylinder assembly 100, in FIG. 1, read head 118 is mounted to piston 104, and rod 117 and control head 116 are mounted to cylinder 101. As piston 104 moves within cylinder 101, read head 118 moves along rod 117. Read head 118 is configured to receive power wirelessly from control head 116, to determine the position of read head 118 relative to rod 117, and to wirelessly communicate position information to control head 116. The communicated position information may be incremental position or absolute position.

Figure 3:
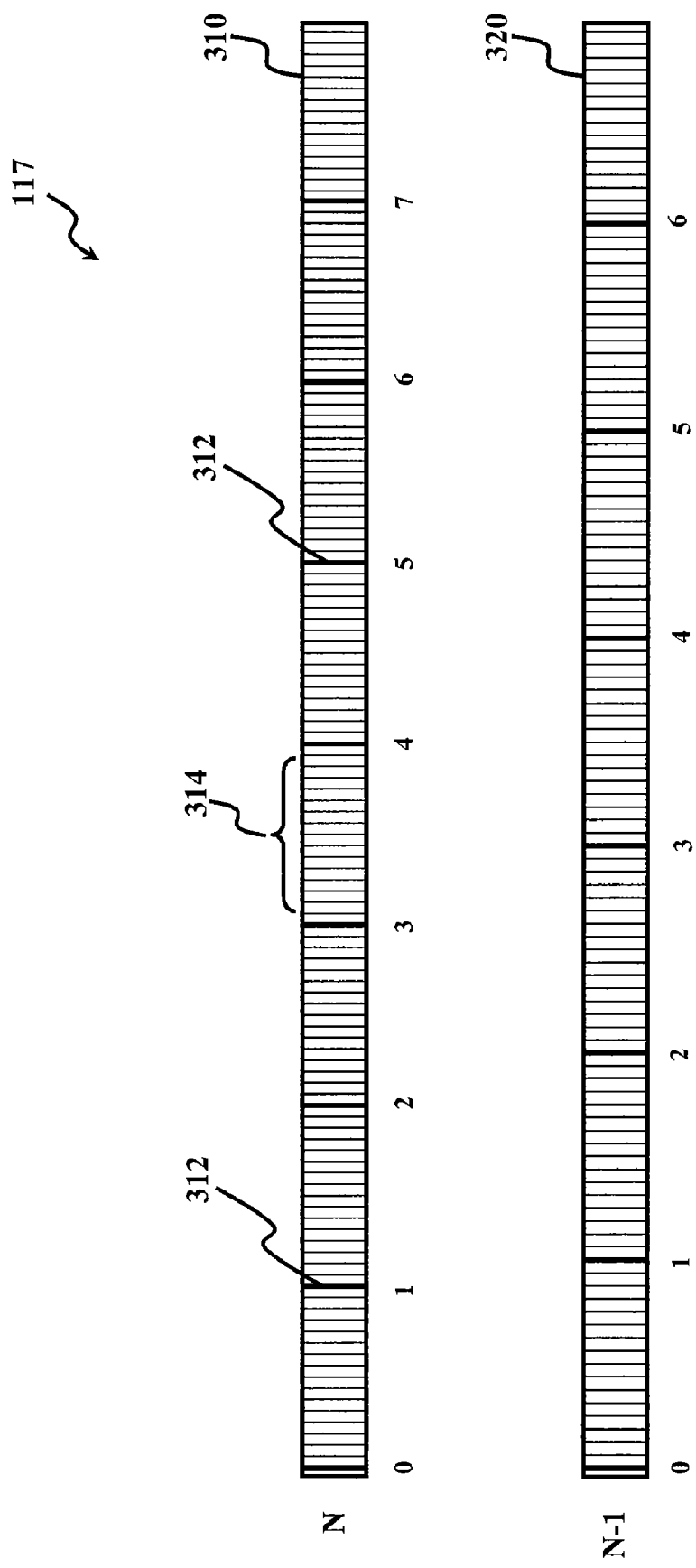
FIG. 3 is an illustration of one embodiment of a scale rod used in a linear position transducer.

FIG. 3 is an illustration of one embodiment of scale rod 117. Rod 117 is formed from a ferrous metal that has a scale 310 formed on its surface. Scale 310 consists of a series of evenly spaced marks (also referred to herein as teeth, targets, or magnetic domains) formed, for example, by etching, machining, forging, casting, or imprinting a series of peaks or valleys of ferrous metal on an otherwise substantially smooth surface. When a magnetic sensor is passed along, and closely adjacent to, a scale so formed, the sensor can detect variations in magnetic flux caused by the marks. Scale 310 includes a series of larger marks 312 and smaller marks 314. Larger marks 312 are referred to herein as "cycles," while smaller marks 314 are referred to as "bits."

Alternatively to being formed from a ferrous metal, rod 117 may be formed from any material having the desired mechanical properties. In the case that rod 117 is formed from a non-ferrous material, the scale marks can be made to include some ferrous metal. For example, rod 117 may be an aluminum rod having scale marks formed by depositing nickel-iron on the surface (or into grooves etched into the surface) of the rod. Furthermore, the nickel-iron marks may be magnetized to enhance their magnetic properties.

Scale 310 is referred to herein as an "N scale," having N cycles and K bits ($2^K$ counts) of resolution per cycle. In the example of FIG. 3, scale 310 has 8 cycles 312 with 16 counts 314 of resolution per cycle. As wireless read head 118 moves along scale rod 117, read head 118 can sense incremental linear position by sensing the equally-spaced marks along scale rod 310. In the alternative, other incremental linear position measurement methods can be used. Alternate incremental linear position measurement techniques are known to those skilled in the relevant art.

For absolute position measurement, an additional scale 320 (referred to herein as an "N−1 scale") can be placed on an opposite side of scale rod 117. Scale 320 can have N−1 cycles and K bits ($2^K$ counts) of resolution per cycle. Together, scales 310 and 320 can be used for absolute position measurement with a resolution of ($N \cdot 2^K$) counts. In addition, in one embodiment, absolute position can be calculated by read head 118 using the following equation:

$$\text{Position} = data_N + 2^K * \left[ \frac{(data_N - data_{N-1}) \bmod 2^K}{2^{(K-\log_2 N)}} \right]$$

where $data_N$=position of read head on N scale;

data$_{N-1}$=position of read head on N−1 scale;
N=number of cycles on N scale; and
K=number of resolution bits in each cycle (e.g., for a cycle with 4-bit resolution, or 16-count resolution, K=4).

Figure 4:
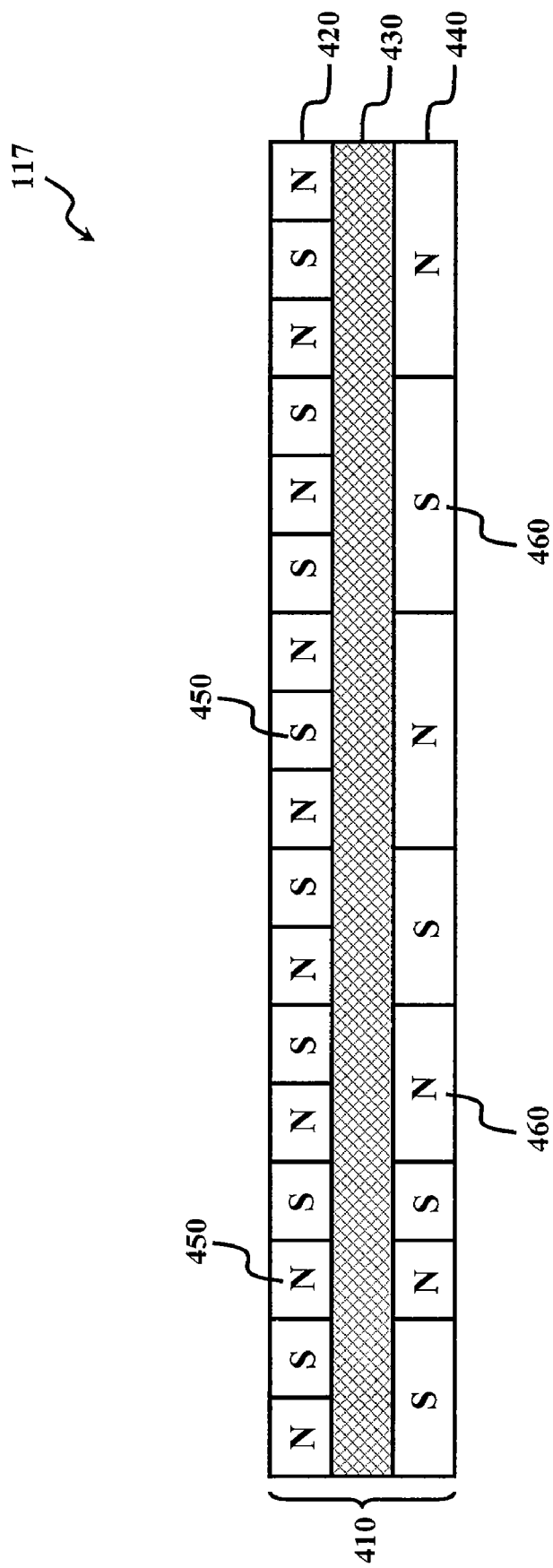
FIG. 4 is an illustration of another embodiment of a scale rod used in a linear position transducer.

In yet another embodiment of scale rod 117, absolute position measurement can be achieved using a combination of a linear scale and a non-linear scale. FIG. 4 is an illustration of one embodiment of rod 117 with a scale 410 formed on its surface. Scale 410 includes a linear scale 420 and a non-linear scale 440 with a non-magnetized area 430 separating the two scales. In this example embodiment, linear scale 420, non-linear scale 440, and non-magnetized area reside on the same surface of rod 117. In measuring absolute position, non-linear scale 440 can be used to sense an absolute value measurement along rod 117 and linear scale 420 can be used to interpolate a fine-resolution position within the absolute value measurement.

Linear scale 420 consists of a series of evenly distributed magnetized areas 450 formed, for example, by alternately encoding a strip of magnetic tape. In contrast, non-linear scale 460 consists of a series of non-evenly distributed magnetized areas 460 that can also, for example, be encoded on a strip of magnetic tape. Magnetized areas 450 and 460 of linear scales 420 and 440, respectively, can be encoded, for example, with magnetic dipoles (e.g., as indicated by magnetized areas with "N" and "S" notations). As magnetic sensors (e.g., one sensor disposed proximate to linear scale 420 and another sensor disposed proximate to non-linear scale 440) are passed along scale 410, the sensors can detect variations in magnetic flux caused by magnetized areas 450 and 460.

Figure 5:
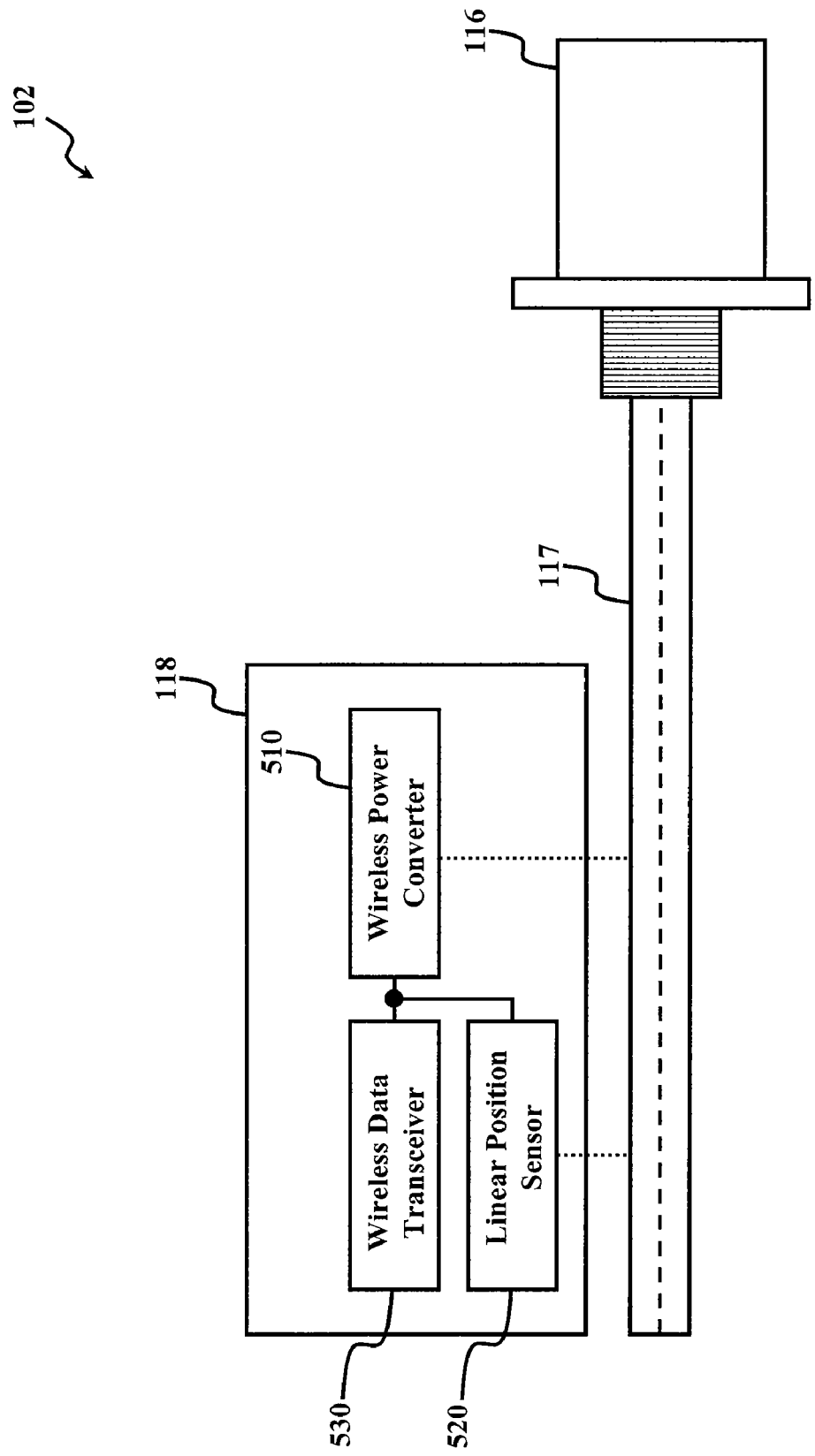
FIG. 5 is an illustration of one embodiment of a wireless read head used in a linear position transducer.

FIG. 5 is an illustration of one embodiment of wireless read head 118. Wireless read head 118 moves along scale rod 117 and measures its position along rod 117. Read head 118 wirelessly transmits position data to control head 116. Read head 118 includes a wireless power converter 510, a linear position sensor 520, and a wireless data transmitter 530. Wireless power converter 510 provides power to the electronic devices of read head 118 including, for example, linear position sensor 520 and wireless data transmitter 530. A more detailed description of wireless power converter 510 is provided below with reference to FIG. 16.

Figure 6:
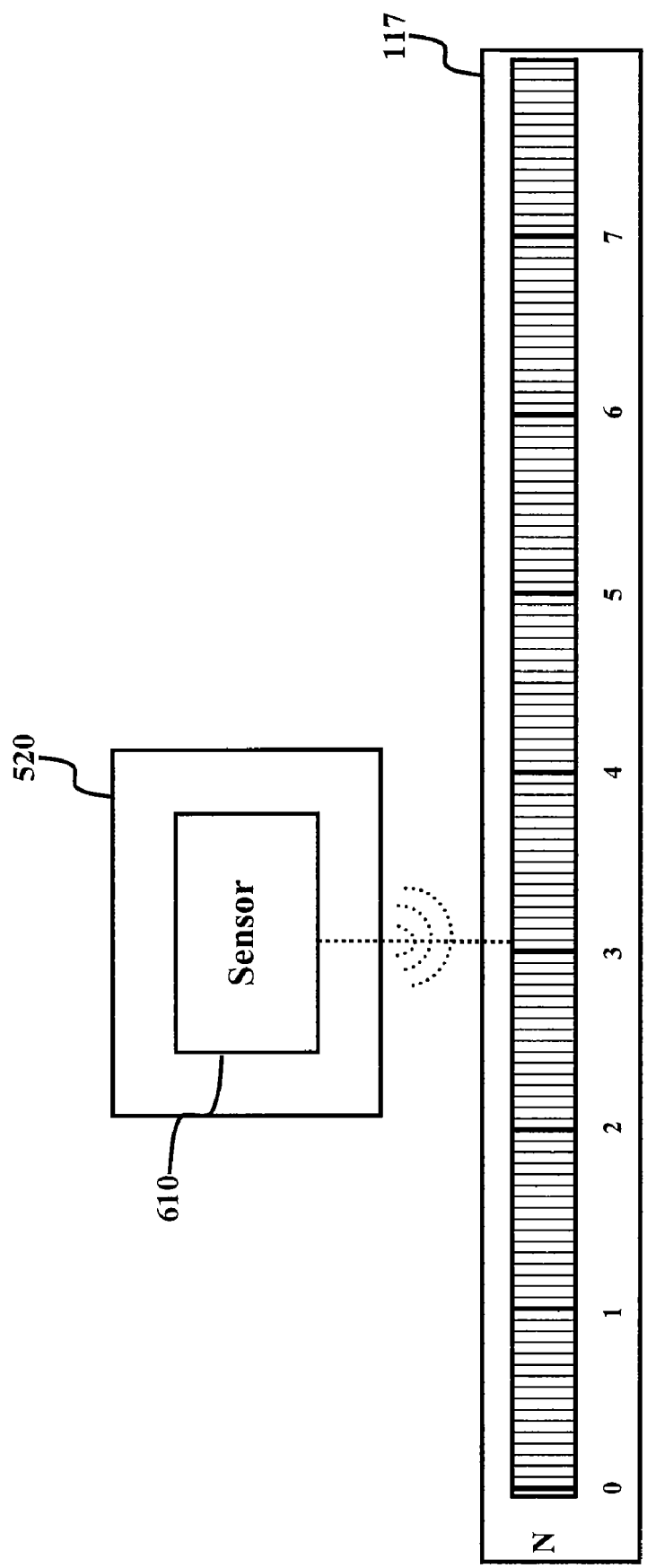
FIG. 6 is an illustration of one embodiment of a linear position sensor used in a wireless read head of a linear position transducer.

FIG. 6 is an illustration of one embodiment of linear position sensor 520. Linear position sensor 520 senses position along scale rod 117. Linear position sensor 520 includes a sensor 610 to sense an incremental position from rod 117. Sensor 610 can be used to track incremental position measurement on rod 117 with an N scale on rod 117, as described above. In one embodiment, a Hall effect sensor can be used for sensor 610. The Hall effect sensor can sense movement between the magnetic targets. Hall effect sensors are known to those skilled in the relevant art. Alternatively, other types of magnetic sensors can be used to sense position along scale rod 117.

Figure 7:
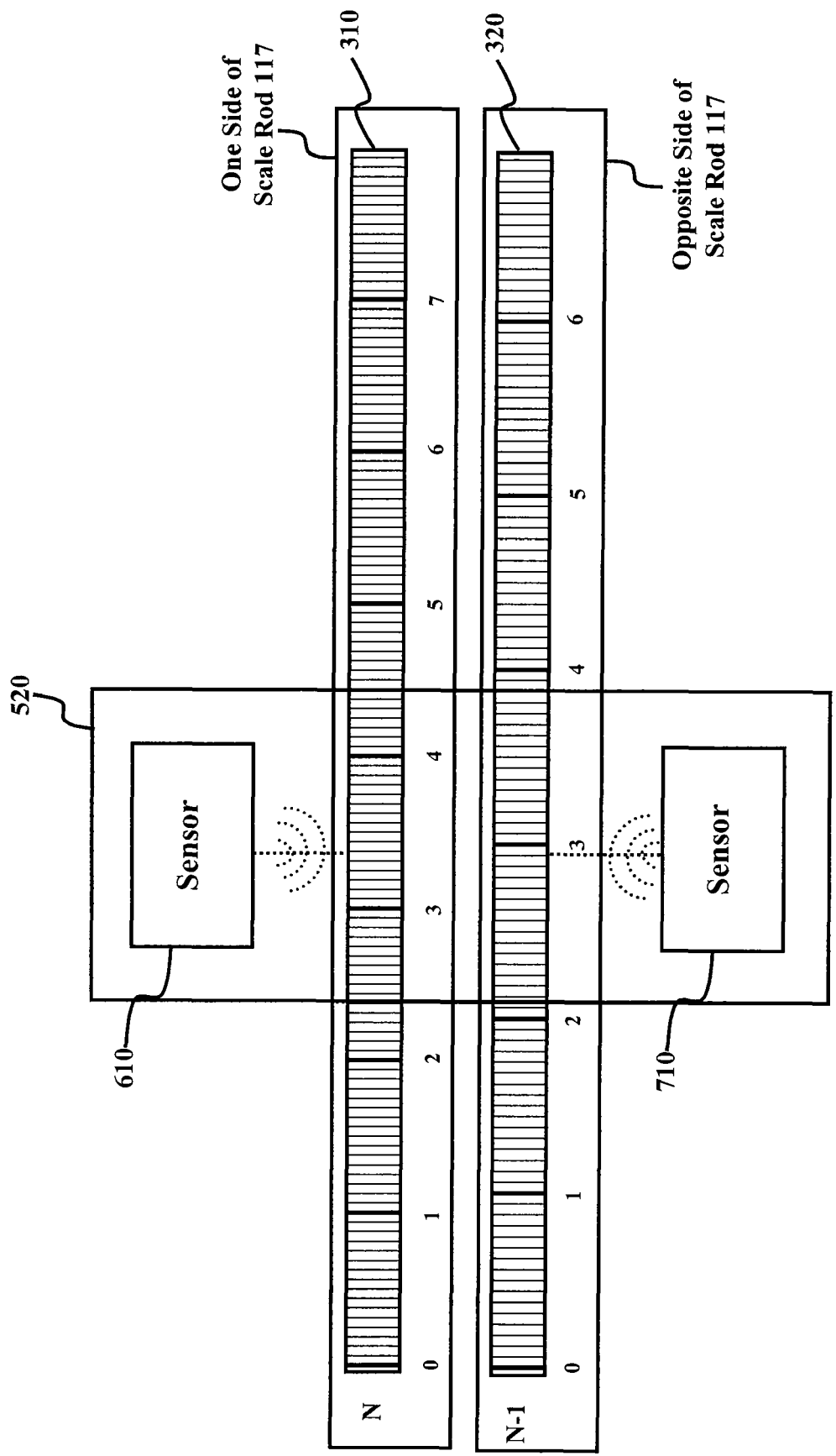
FIG. 7 is an illustration of another embodiment of a linear position sensor used in a wireless read head of a linear position transducer.

FIG. 7 is an illustration of another embodiment of linear position sensor 520. This embodiment includes sensors 610 and 710 to sense an absolute position from scale rod 117. Similar to the description with respect to FIG. 3, rod 117 can include an N scale and an N−1 scale to sense absolute position, where the N scale is on one side of rod 117 and the N−1 scale is on the opposite side of rod 117. FIG. 8 is an illustration of one embodiment of relative locations of the N and N−1 scales and sensors 610 and 710 in a three-dimensional view that includes linear position sensor 520. Further, in one embodiment, a Hall effect sensor can be used for sensors 610 and 710 to sense movement between magnetic etchings on the N and N−1 scales. Alternatively, other types of sensors can be used.

Figure 9:
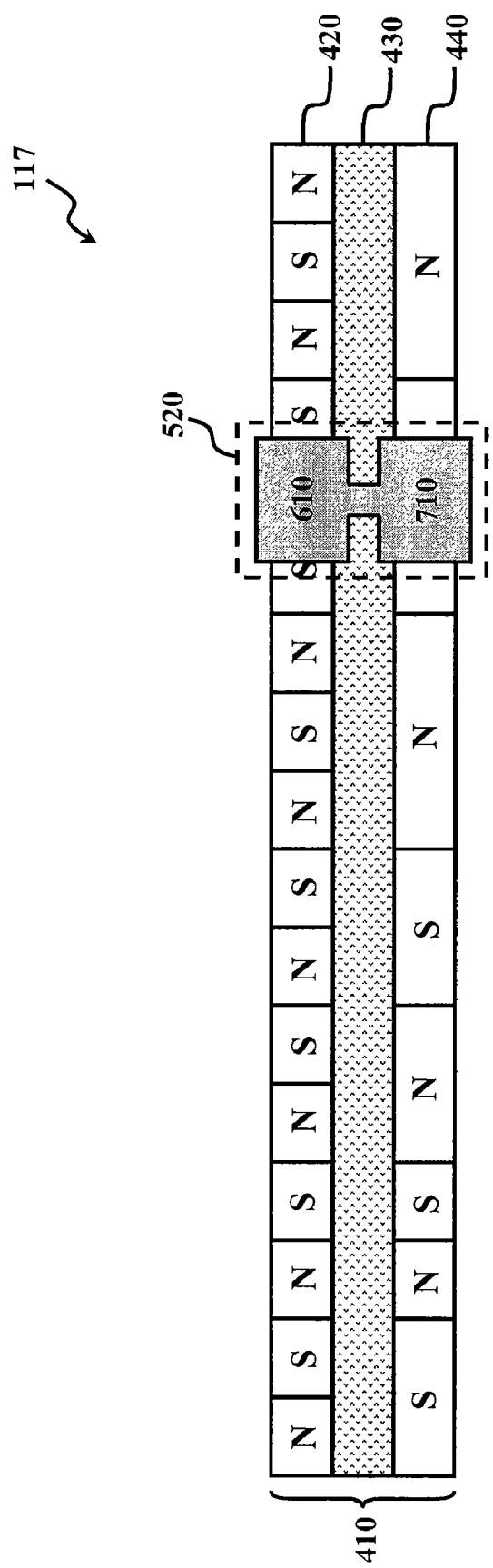
FIG. 9 is an illustration of another embodiment of a linear position sensor used in a wireless read head of a linear position transducer.

FIG. 9 is an illustration of yet another embodiment of linear position sensor 520. This embodiment includes sensors 610 and 710 to sense an absolute position from scale rod 117, where linear and non-linear scales are formed on rod 117. Similar to the description with respect to FIG. 4, rod 117 can include a combination of a linear scale and a non-linear scale to sense absolute position, where these two scales are formed on a surface of rod 117. In this configuration, sensor 710 can be used to sense an absolute value measurement along the non-linear scale, while sensor 610 can be used to interpolate a fine-resolution position along linear scale 420. In one embodiment, sensor 710 can be configured to send a reference pulse to the non-linear scale to detect its relative location along rod 117. In turn, sensor 610 can send a reference pulse to the linear scale to detect its relative location within the area detected by sensor 710. With the location measurements from sensors 610 and 710, an absolute position measurement can be made as would be recognized by a person of ordinary skill in the relevant art.

In the discussion set forth above, electromagnetic sensing techniques are used to sense position along scale rod 117. Based on the discussion herein, a person of ordinary skill in the art will recognize that other sensing techniques can be used such as, for example, inductive measurement techniques. Furthermore, for certain applications, still further sensing techniques, such as optical sensing, may be used. If optical sensing is used, the scale markings on the scale rod will be optically sensed rather than electromagnetically or inductively sensed.

Figure 10:
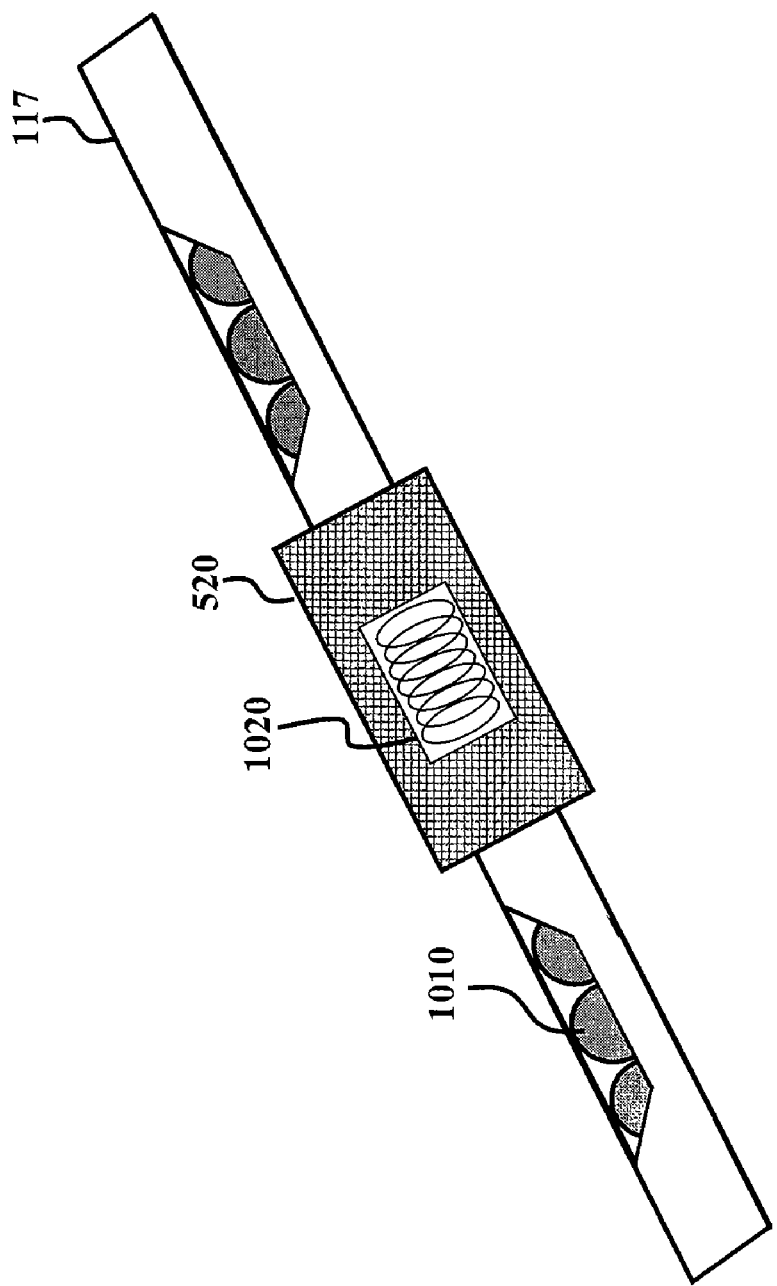
FIG. 10 is an illustration of one embodiment of an inductive measuring technique used in a wireless read head of a linear position transducer.

FIG. 10 is an illustration of one embodiment of an inductive measuring technique that can be used in the present invention. Scale rod 117 includes spherical steel balls 1010 placed into a hollow shaft or lumen formed in the rod. Linear position sensor 520 surrounds rod 117 and includes a primary coil 1020 and a secondary coil (not shown) over the primary coil. Both primary coil 1020 and the secondary coil are wound around rod 117. As current is passed through the secondary coil, a magnetic field is induced along rod 117. Steel balls 1010, as a result, cause the permeability of scale 117 to vary periodically with each pitch of a steel ball. In turn, voltages induced in primary coil 1020 vary according to a relative position of primary coil 1020 to underlying steel balls 1010. Based on a reference point along scale rod 117 and a number of pitches (i.e., steel balls 1010) traversed since the reference point, absolute position can be measured as would be understood by a person of ordinary skill in the relevant art.

Returning to FIG. 5, in one embodiment, linear position sensor 520 can receive analog measurements from scale rod 117 and transmit these measurements to control head 116 via wireless data transmitter 530 for further processing. In the alternative, linear position sensor 530 can be configured to sample (i.e., digitize) the analog measurements prior to transmitting the data to control head 116. Data sampling techniques are known to those persons of ordinary skill in the relevant art.

Figure 11:
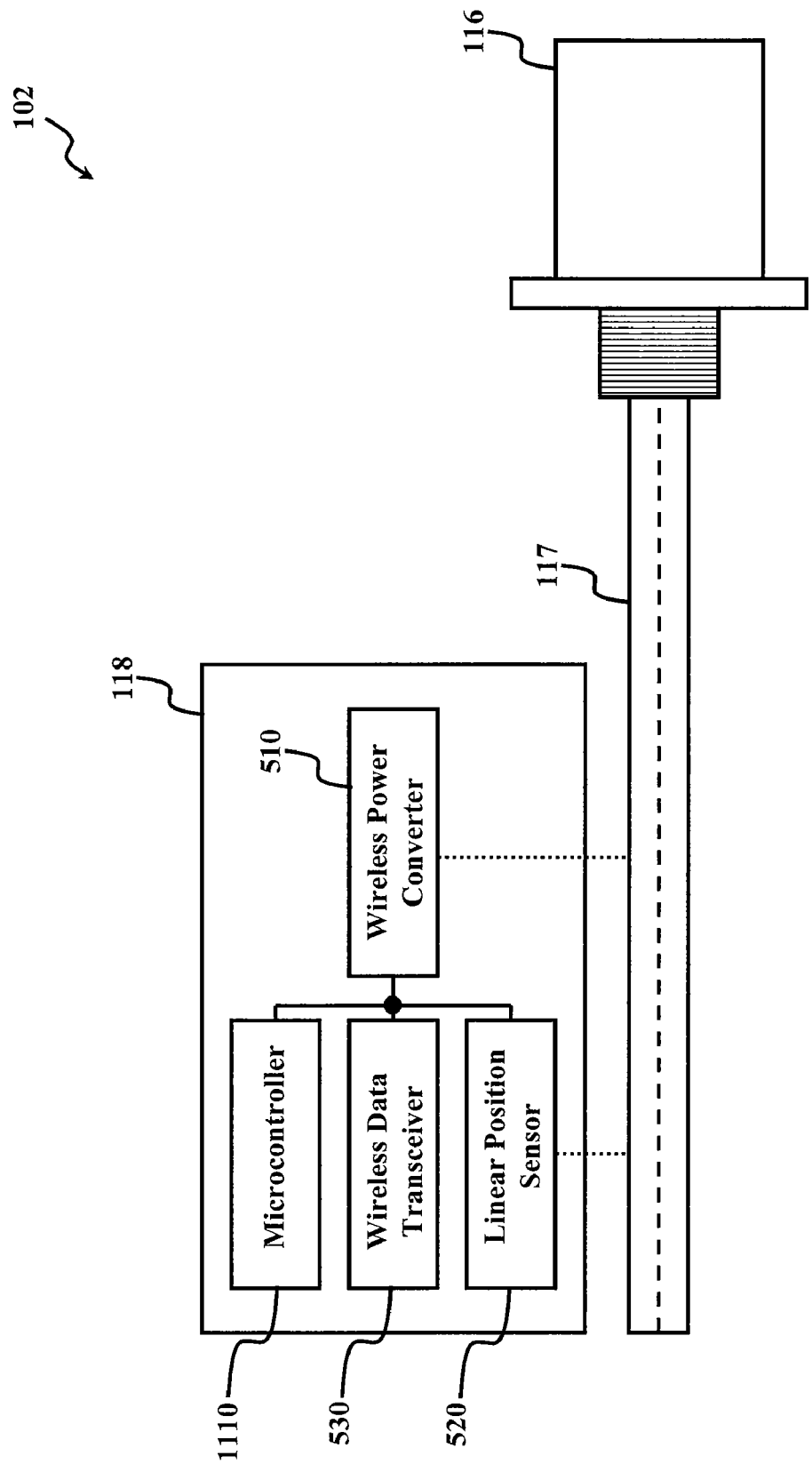
FIG. 11 is an illustration of another embodiment of a wireless read head used in a linear position transducer.

FIG. 11 is an illustration of another embodiment of wireless read head 118. In this embodiment, wireless read head 118 includes a microcontroller 1110. Microcontroller 1110 can receive position data from linear position sensor 520 and process the data into a position measurement. As described with respect to FIG. 6, microcontroller 1110 can receive incremental position data from linear position sensor 520. As described with respect to FIG. 7, microcontroller 1110 can receive position data from linear position sensor 520 and, in one embodiment, calculate an absolute position applying equation (1) above. In this example embodiment, all position measurements and calculations are generated by microcontroller 1110 in wireless read head 118. Further, as described with respect to FIG. 9, microcontroller 1110 can receive position data from measurements on linear scale 420 and non-linear scale 440 and calculate an absolute position accordingly. Implementation of an appropriate microcontroller would be known to a person skilled in the relevant art.

In FIG. 11, wireless data transmitter 530 can receive a position measurement from microcontroller 1110 and wirelessly transmit the measurement information to control head 116. In the alternative, wireless data transmitter 530 can receive position data from linear position sensor 520 and wirelessly transmit the position data to control head 116. Wireless communication protocols such as ZigBee and Bluetooth, for example, can be used to transmit and receive wireless information in linear position transducer 102. Alternatively, other types of wireless communication protocols can be used. Wireless transmission of data is known to those skilled in the relevant art.

A person of ordinary skill in the relevant art will recognize that wireless data transmitter 530 can also be configured to receive data from control head 116 and distribute this data to components in read head 118. This data can be used to update component parameters in read head 118 such as, for example, a transmission rate for wireless data and configuration settings in microcontroller 1110. In embodiments where such two-way communication between read head 118 and control head 116 is desired, transmitter 530 may be implemented as a transceiver, having both a transmit function and a receive function. Thus, depending on the particular application, transmitter 530 may be implemented as a transceiver or a transmitter. Moreover, as the term "transceiver" is used herein, it is intended to include a device that includes both transmit and receive functionality. Thus, a "transceiver" includes both a receiver and a transmitter. The term "transmitter" is intended to include any device that includes transmit functionality (e.g., a transceiver is a transmitter). Similarly, the term "receiver" is intended to include any device that includes receive functionality (e.g., a transceiver is a receiver).

Figure 12:
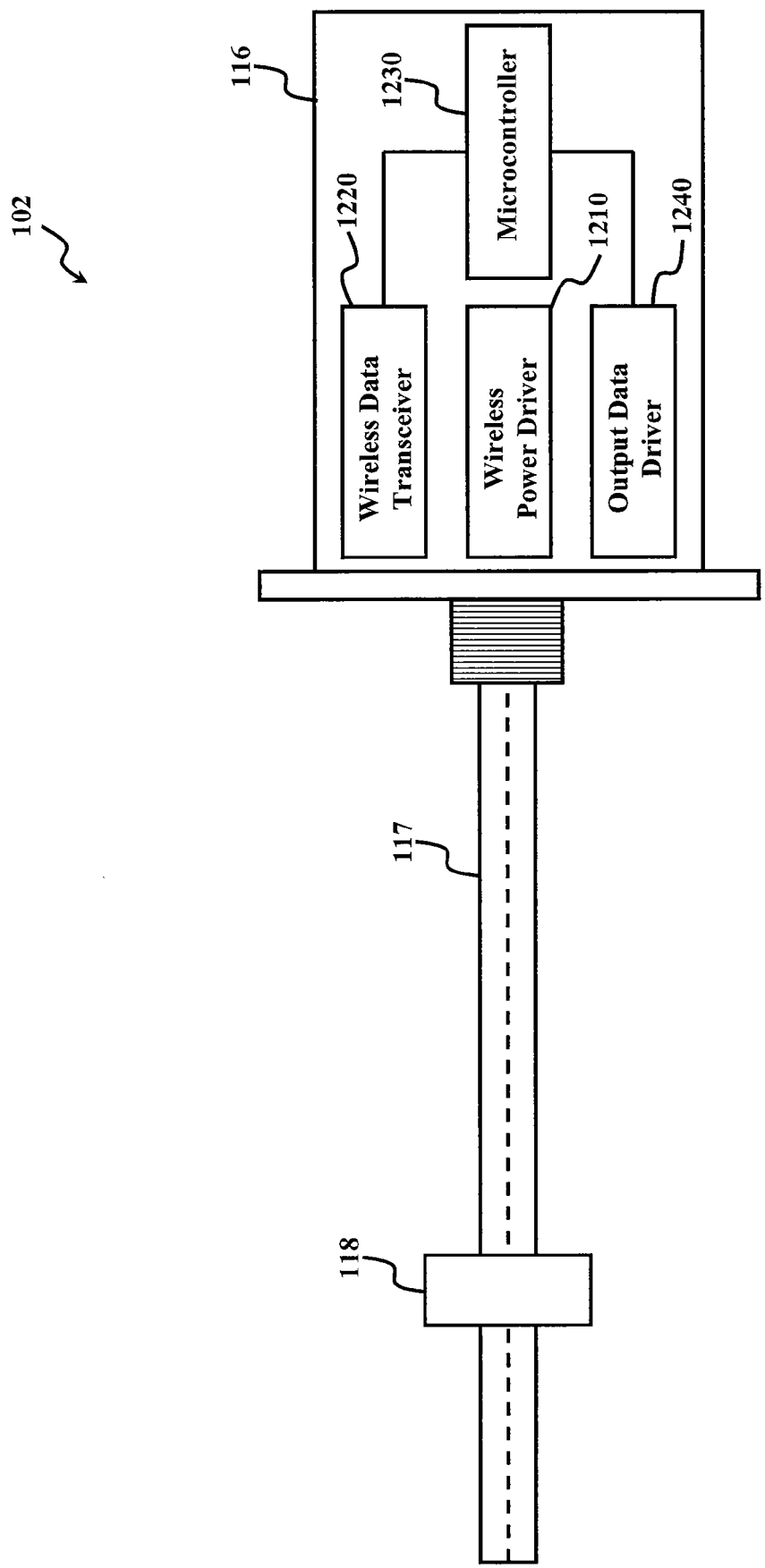
FIG. 12 is an illustration of one embodiment of a control head used in a linear position transducer.

FIG. 12 is an illustration of one embodiment of control head 116. Control head 116 receives measurement information from wireless read head 118 and communicates the measurement information to an external device. For instance, linear position transducer 102 can be implemented in a rapidly-moving hydraulic cylinder which is part of an industrial robot used in a manufacturing assembly line, where linear position of the piston relative to the cylinder must be measured rapidly and accurately. In such an implementation, control head 116 can communicate the position information back to a controller that controls the operation of the robot.

Control head 116 includes a wireless power driver 1210, a wireless data receiver 1220, a microcontroller 1230, and an output data driver 1240. As described in detail below, with respect to FIGS. 15 and 16, wireless power driver 1210 facilitates wireless energy transfer using scale rod 117, which in turn, wirelessly transfers energy to wireless read head 118.

Figure 13:
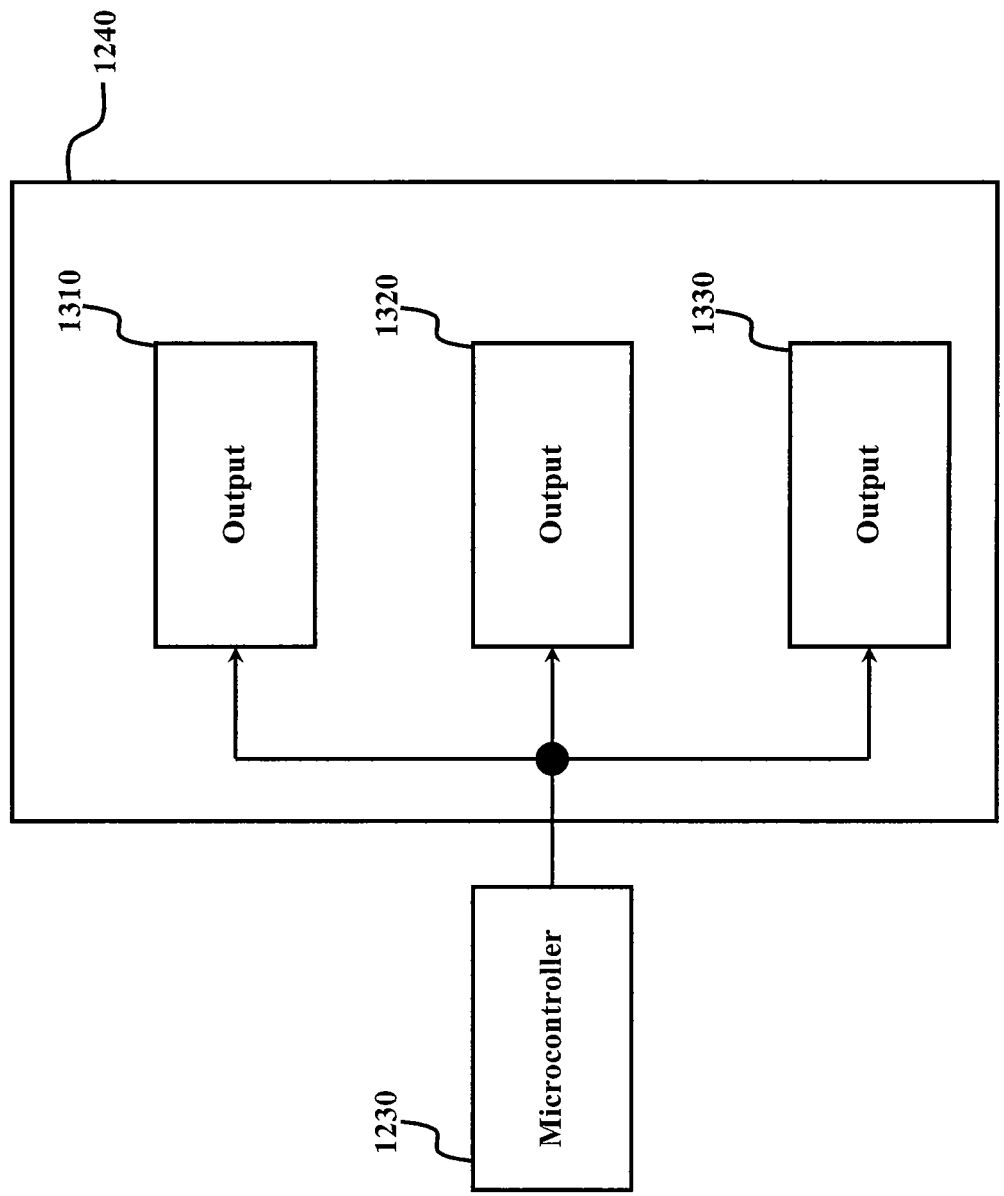
FIG. 13 is an illustration of one embodiment of a plurality of output ports coupled to a microcontroller used in a control head of a linear position transducer.

Wireless data receiver 1220 receives position data from wireless data transmitter 530 and transfers the data to microcontroller 1230. If a microcontroller device is not available in wireless read head 118 to process position data captured by linear position sensor 520, microcontroller 1230 in FIG. 12 can be configured to compute both incremental and absolute position measurements according to the methods described above. After the position measurements are processed by either read head 118 or control head 116, microcontroller 1230 transfers the processed data to an external device (e.g., a system implementing linear position transducer 102) through one or more output ports in output data driver 1240. In one embodiment, as illustrated in FIG. 13, microcontroller 1230 can transfer measurement information to a plurality of outputs 1310-1330, where the format of the output data can be in a variety of industry-standard serial or parallel data formats.

As described above, wireless data transmitter 530 may be implemented as a transceiver, having the ability to both send and receive data. This would allow transceiver 530 to receive configuration data, for example, from control head 116. In such an embodiment, wireless data receiver 1220 may also be implemented as a transceiver, having both a transmit function and a receive function so that data transceiver 1220 could transmit configuration data, for example, to transceiver 530. This would permit two-way communications between control head 116 (using transceiver 1220) and read head 118 (using transceiver 530).

An important advantage of linear position transducer 102 is that power is communicated wirelessly to wireless read head 118, and position measurement data is communicated wirelessly from read head 118. This elimination of all wired connections to read head 118 allows read head 118 to be used in applications and environments (e.g., within a hydraulic cylinder) where a wired transducer would be difficult to reliably implement.

Figure 14A:
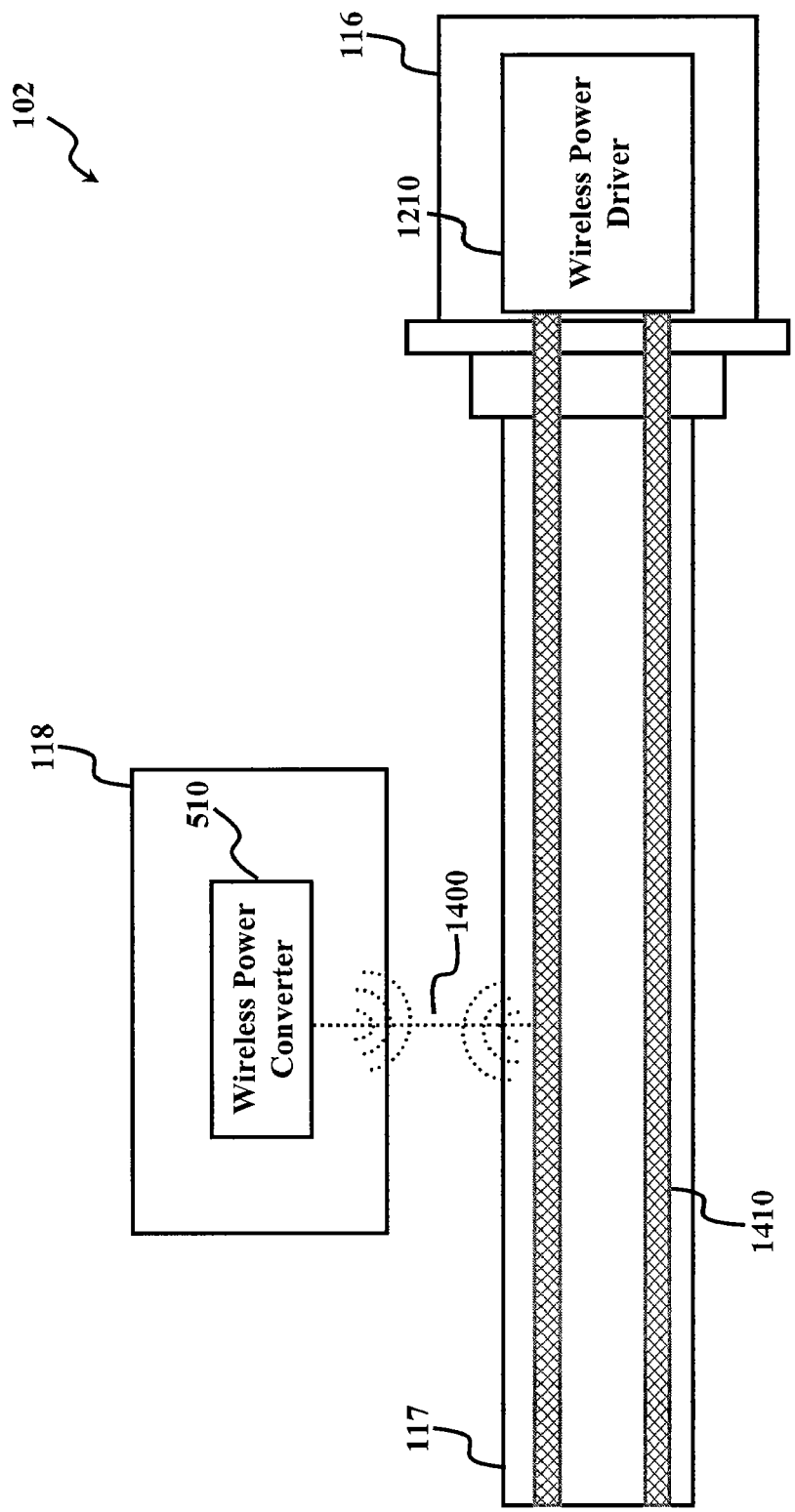
FIG. 14(a) is an illustration of one embodiment of a wireless energy transfer system used in a linear position transducer.
Figure 14B:
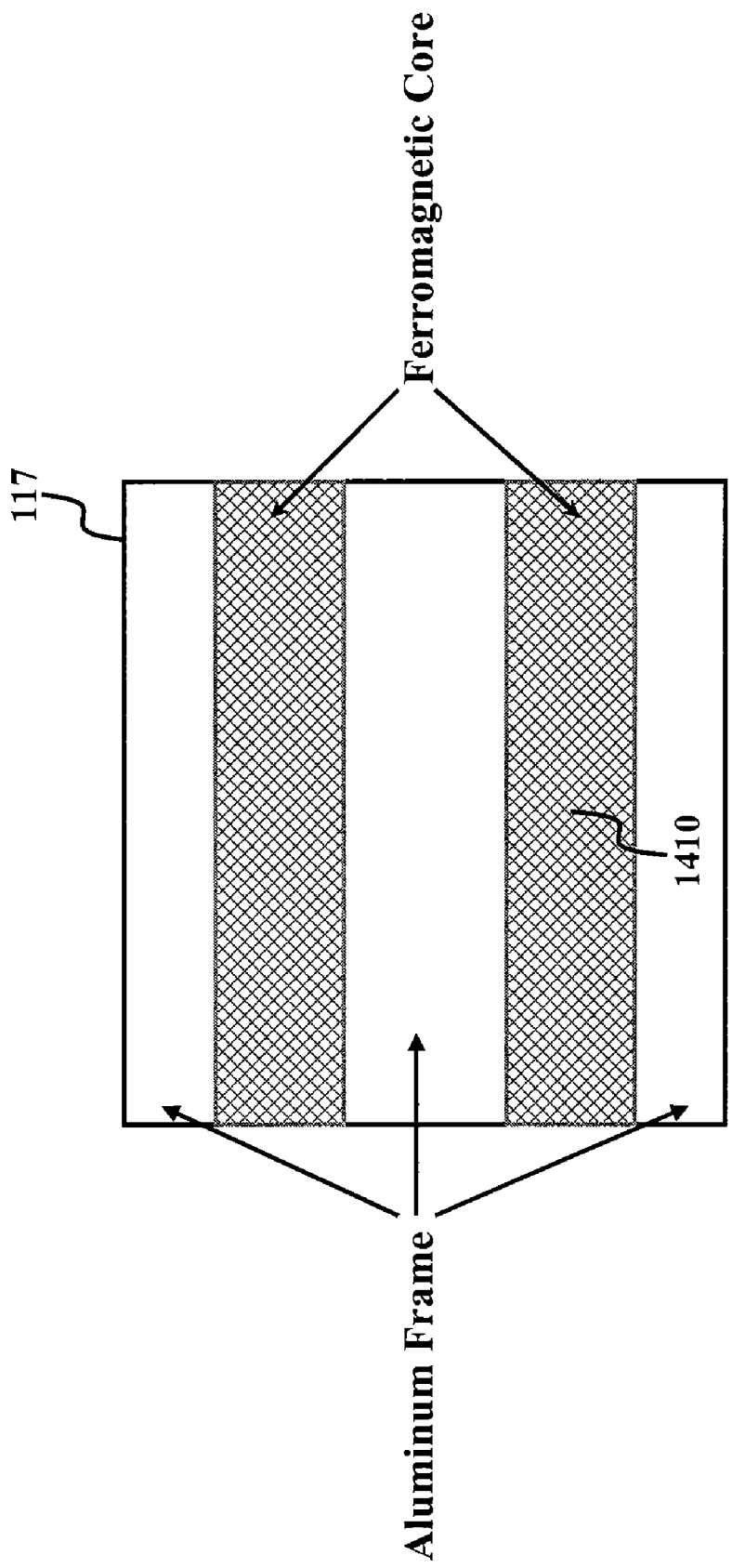
FIG. 14(b) is an illustration of a section of one embodiment of a scale rod used in a wireless energy transfer system of a linear position transducer.

FIG. 14(*a*) is an illustration of one embodiment of a wireless energy transfer system 1400 for use in linear position transducer 102. In this embodiment, power is provided to wireless read head 118 from control head 116 through a wireless energy transfer mechanism. Wireless energy transfer system 1400 includes a ferromagnetic core 1410 disposed within scale rod 117, wireless power driver 1210 in control head 116, and wireless power converter 510 in wireless read head 118.

FIG. 14(*b*) is an illustration of a section of one embodiment of scale rod 117. Rod 117 can be composed of an aluminum frame, where ferromagnetic core 1410 is encompassed by the frame. In the alternative, as a person of skill in the relevant art will appreciate, rod 117 can be composed of other types of material. In addition, ferromagnetic core 1410 can be composed of a wide variety of ferromagnetic materials, such as iron, cobalt, and nickel.

Figure 15:
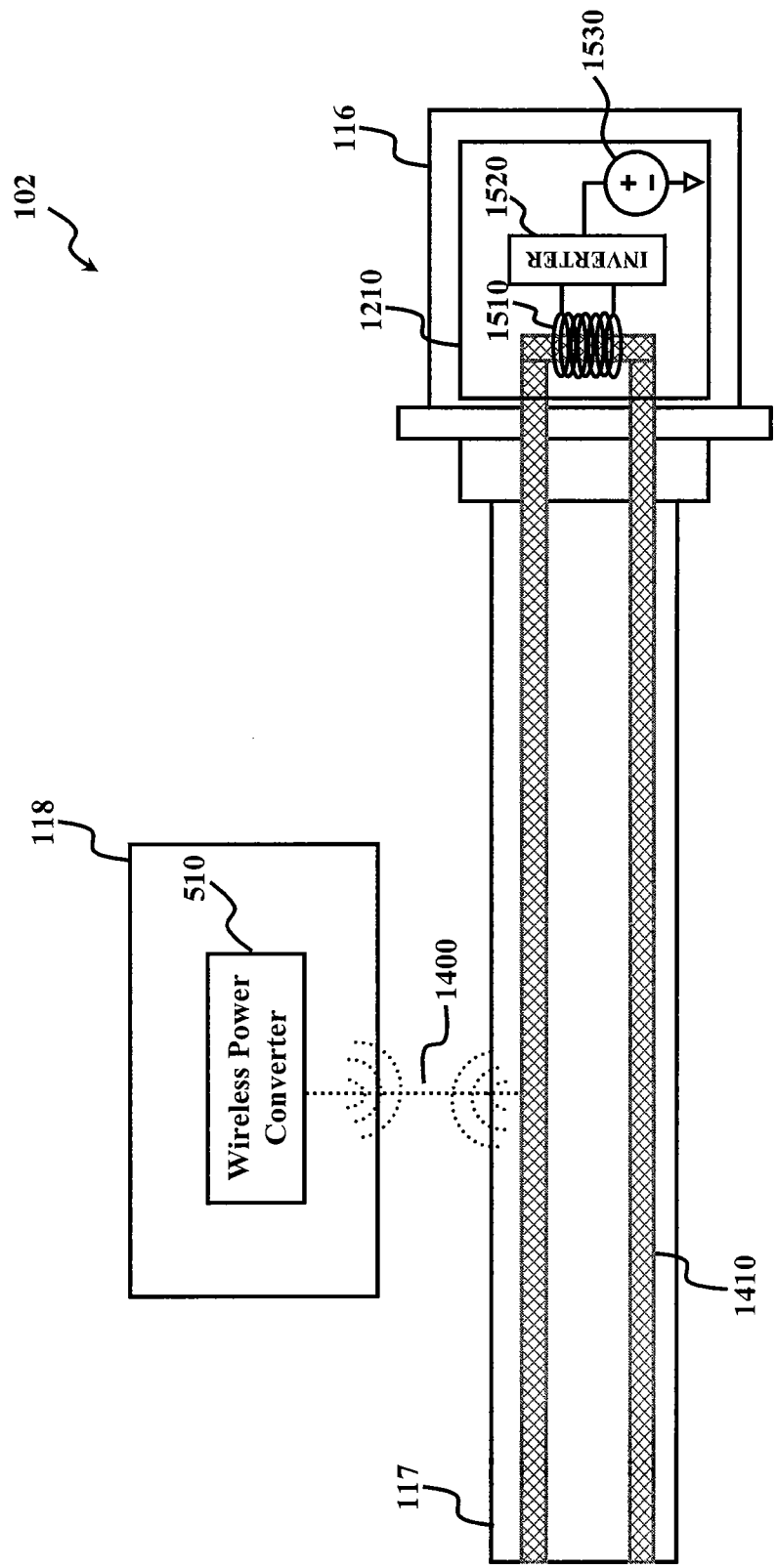
FIG. 15 is an illustration of one embodiment of a wireless power driver used in a wireless energy transfer system of a linear position transducer.

FIG. 15 is an illustration of one embodiment of wireless power driver 1210. Wireless power driver 1210 includes a primary coil 1510, an inverter 1520, and a voltage source 1530. Primary coil 1510 is wound around ferromagnetic coil 1410 and generates a magnetic field when an electric current passes through it. The electric current is provided by voltage source 1530. Inverter 1520 modulates current flow through primary coil 1510 and thus changes the strength of the magnetic field generated by coil 1510.

Figure 16:
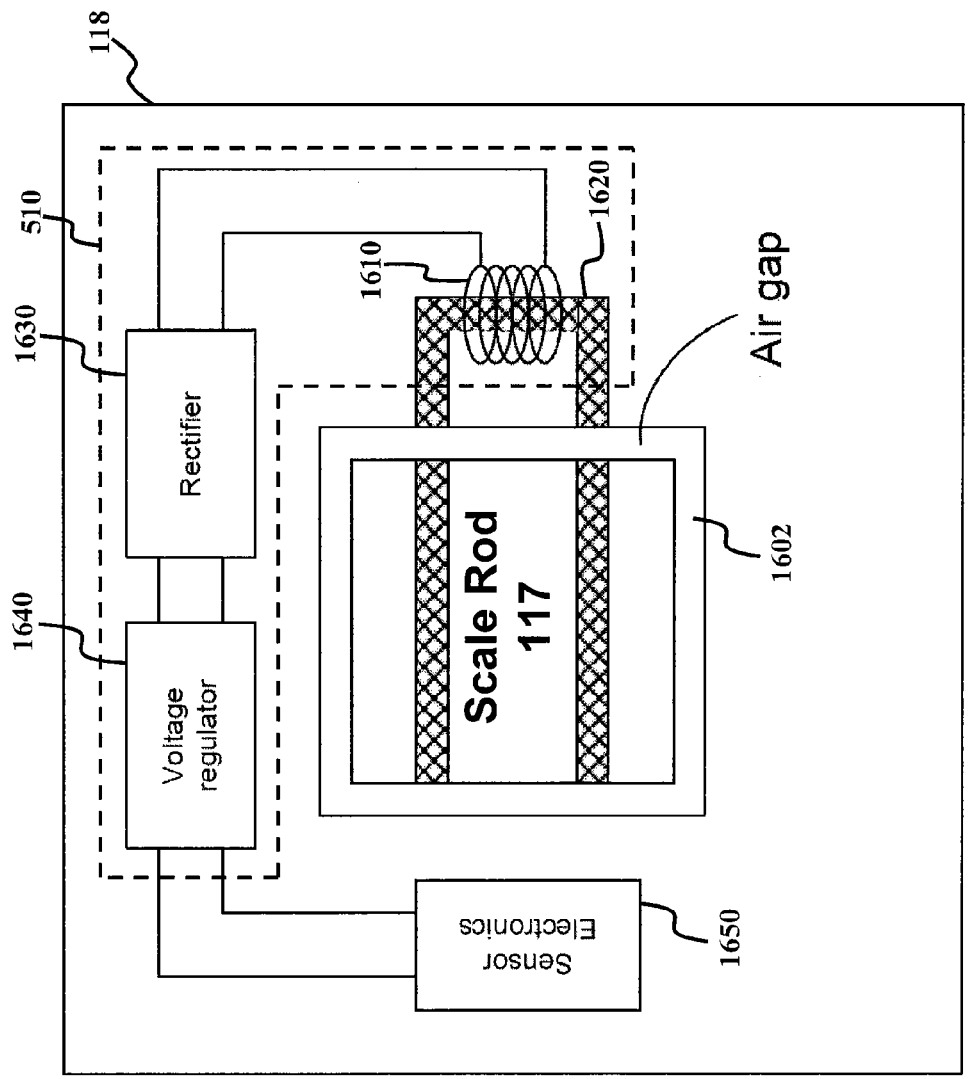
FIG. 16 is an illustration of one embodiment of a wireless power converter used in a wireless energy transfer system of a linear position transducer.

FIG. 16 is an illustration of one embodiment of wireless power converter 510 within wireless read head 118. FIG. 16 is a combination of a block diagram of power converter 510 and a cross-sectional view showing the relationship between read head 118 and rod 117. Note that rod 117 passes through an opening 1602 in the housing of read head 118. This intimate relationship between read head 118 and rod 117 allows magnetic flux coupling between core 1410 of rod 117 and a ferromagnetic core 1620 of read head 118.

Wireless power converter 510 includes a secondary coil 1610 wound around ferromagnetic core 1620, a rectifier circuit 1630, and a voltage regulator 1640. Ferromagnetic core 1620 is configured for magnetic flux coupling with core 1410 of rod 117 such that the magnetic field generated by primary coil 1510 induces an electric current in secondary coil 1610. Similar to ferromagnetic core 1410, ferromagnetic core 1620 can be composed of a wide variety of ferromagnetic materials, such as iron, cobalt, and nickel.

Coil 1510, coil 1610, and cores 1410 and 1620 essentially form a transformer with energy being transferred from coil 1510 (which acts as a transformer primary) to coil 1610 (which acts as a transformer secondary). The ratio of the number of turns of coil 1610 to the number of turns of coil 1510 will affect the voltage and current transfer characteristics of the transformer, as would be apparent to a person skilled in the relevant art.

Returning to FIG. 16, rectifier circuit 1630 receives an AC power signal from secondary coil 1620 and converts it into a rectified voltage (which, with simple filtering, will become a DC voltage). Rectifier 1630 and/or regulator 1640 may include a filter circuit to smooth the rectified voltage to produce a smoothed DC voltage. Voltage regulator 1640 can be used to set and maintain an appropriate DC voltage level for sensor electronics 1650 in read head 118. Rectifier circuits, filter circuits, and voltage regulators are known to those skilled in the relevant art.

Figure 17:
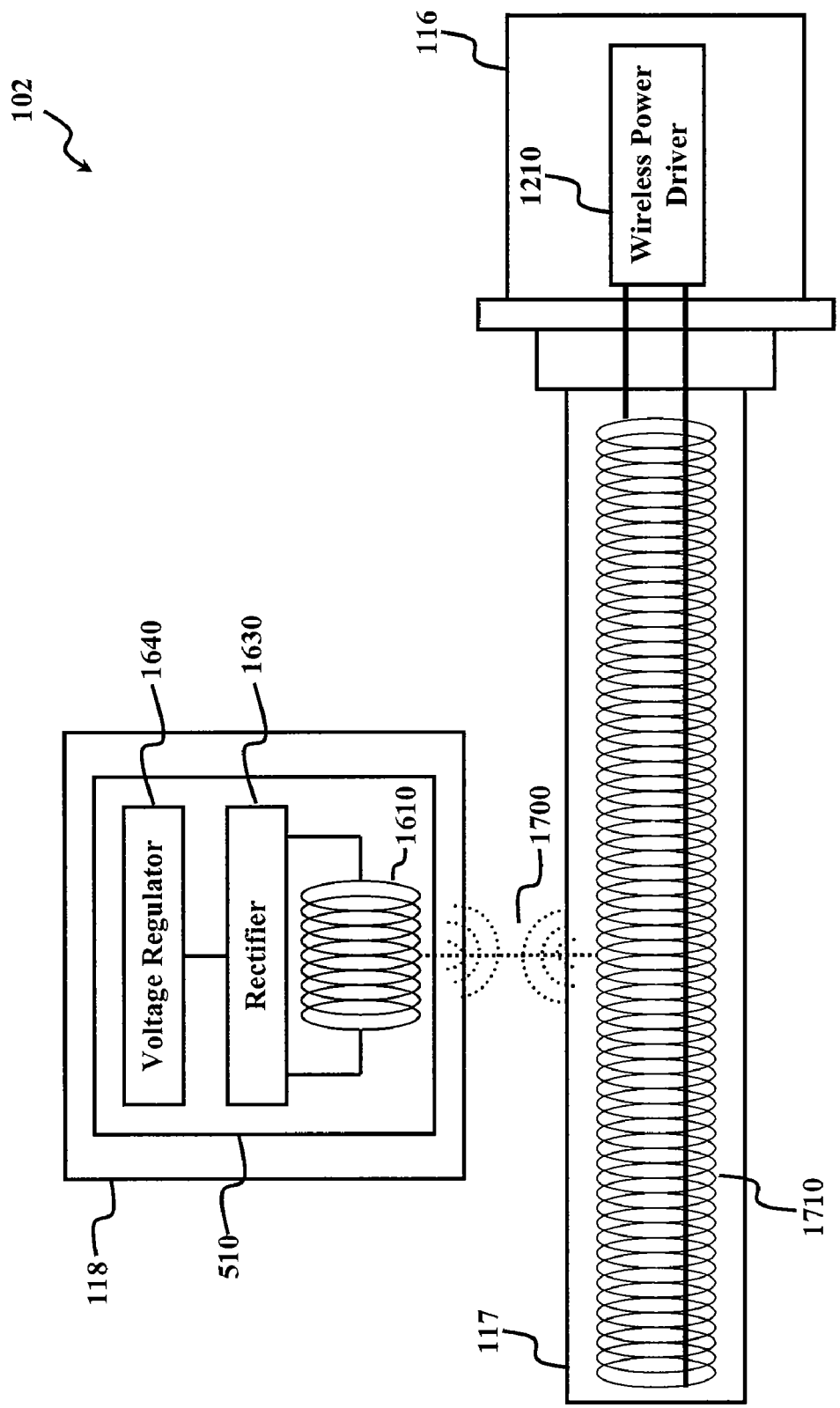
FIG. 17 is an illustration of another embodiment of a wireless energy transfer system used in a linear position transducer

FIG. 17 is an illustration of another embodiment of a wireless energy transfer system 1700 that can be used in linear position transducer 102. Wireless energy transfer system 1700 includes an inductive coil 1710 disposed within scale rod 117, wireless power converter 510 in wireless read head 118, and wireless power driver 1210 in control head 116. In this embodiment, wireless power driver 1210 is configured to drive inductive coil 1710 to inductively transfer energy from inductive coil 1710 to inductive coil 1610 without the use of the magnetic cores shown in FIGS. 14-16. Inductive energy transfer mechanisms are known to those persons of ordinary skill in the relevant art.

In yet another alternate embodiment of FIG. 17, radio frequency (RF) technology (i.e., the same technology used for RF identification tags and transponders) can be used to transfer energy from coil 1710 to coil 1610. In this embodiment, all components will be selected for use with the relatively high frequencies used for RF power transmission, as would be apparent to a person skilled in the relevant art. Furthermore, with an RF implementation, it may be possible to locate coil 1710 (i.e., the transmitting antenna) at a location other than within rod 117. For example, coil 1710 may be mounted in or adjacent to power driver 1210.

Thus far, wireless energy transfer systems in the form of electromagnetic energy conversion have been considered. Based on the discussion herein, a person of ordinary skill in the relevant art will appreciate that other types of energy conversion mechanisms can be used to provide power to wireless read head 118. For instance, a power scavenging mechanism can be used to convert a vibrational energy or a kinetic energy of moving read head 118 into electric energy.

One example, among others, of a power scavenging mechanism that can be used in the present invention is power harvesting through piezoelectric means. In general, when a piezoelectric material (e.g., certain ceramics and polymers) is subject to stress or strain, electrical charge is produced on its surface as the material undergoes physical deformation. This characteristic of piezoelectric material can be used to provide power to wireless read head 118. In one embodiment, the piezoelectric material can be incorporated into the read head design where, as wireless read head 118 moves rapidly along scale rod 117, electric charge is produced on a surface of the piezoelectric material. More specifically, an alternating current results due to a vibration (e.g., stress and strain) in the piezoelectric material encompassed in the read head design. This alternating current can be converted into a DC voltage using, for example, the rectifier and voltage regulator circuits described above with respect to FIG. 16.

Figure 18:
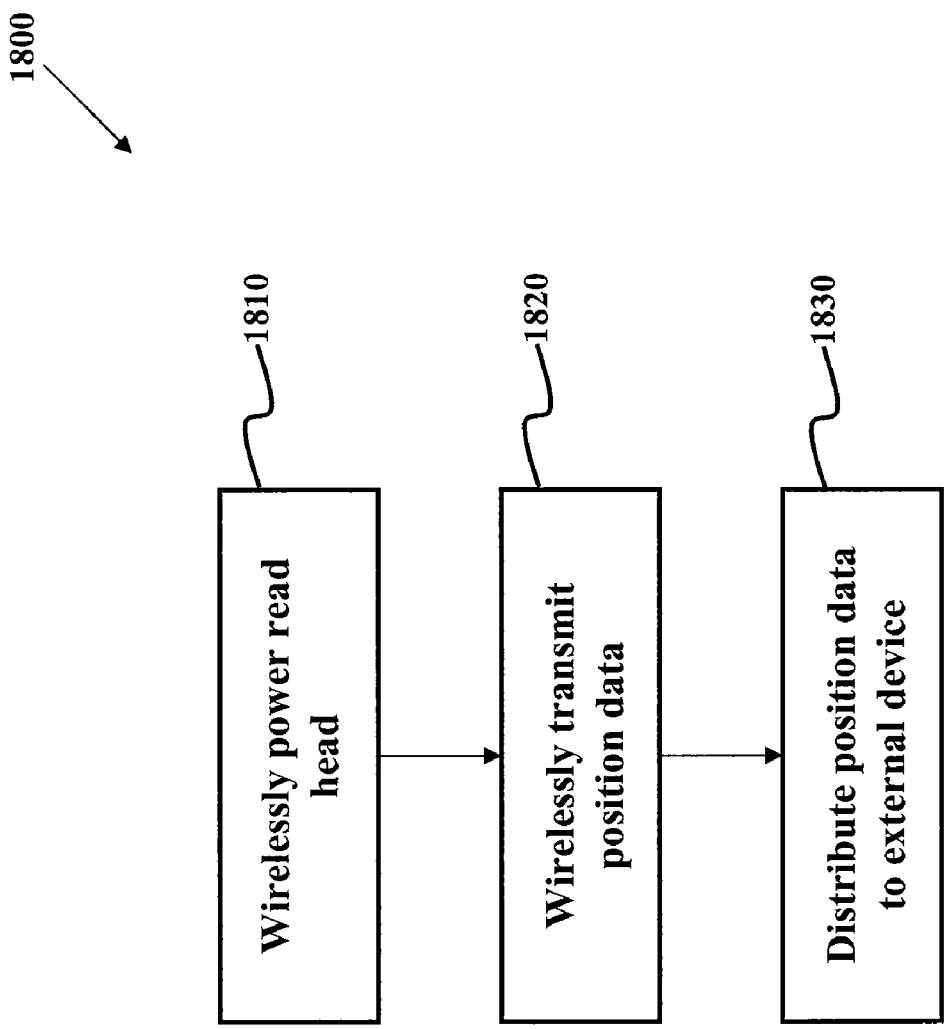
FIG. 18 is an illustration of one embodiment of a method for generating a linear position measurement.

FIG. 18 is an illustration of one embodiment of a method 1800 for generating a linear position measurement. Method 1800 can be performed using, for example, linear position transducer 102. In step 1810, a read head, used to measure position along a scale rod, is wirelessly powered. In step 1820, position data from the read head is wirelessly transmitted to a control head. The position data can be calculated by a microcontroller in the read head or in the control head. In either case, the microcontroller can calculate incremental and/or absolute position. Further, wireless communication protocols such as ZigBee and Bluetooth can be used to transmit data from the read head to the control head.

In step 1830, the position data received by the control head is communicated to an external device, such as a control system requiring an indication of linear position of a robotic arm, for example.

While various embodiments of the present invention have been described above, it should be understood that they have been presented by way of example, and not limitation. It will be apparent to persons skilled in the relevant art(s) that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A linear position transducer comprising:
    a scale;
    a control head; and
    a wirelessly-powered read head disposed proximate to the scale, the read head configured to sense movement between the scale and the read head and to wirelessly communicate position data to the control head.

2. The linear position transducer of claim 1, further comprising:
    a power system to wirelessly transfer energy from the control head to the read head.

3. The linear position transducer of claim 2, wherein the power system comprises:
    a first coil wound around a first ferromagnetic core, wherein the first ferromagnetic core is located in the scale and has a wired connection to the control head;
    a second coil wound around a second ferromagnetic core, wherein the second ferromagnetic core is located in the read head, and wherein the first and second ferromagnetic cores are disposed in close proximity to one another to allow energy transfer via magnetic flux coupling between the cores; and a rectifier circuit located in the read head and coupled to the second coil to rectify an AC power signal generated by the second coil.

4. The linear position transducer of claim 3, wherein the power system further comprises a voltage regulator to set an appropriate DC voltage level for electronic devices within the read head.

5. The linear position transducer of claim 1, wherein the scale comprises an N scale to measure incremental position.

6. The linear position transducer of claim 1, wherein the scale comprises an N scale and an N−1 scale to measure absolute position.

7. The linear position transducer of claim 1, wherein the scale comprises a combination of a linear scale and a non-linear scale to measure absolute position.

8. The linear position transducer of claim 1, wherein the scale comprises a rod having a hollow shaft formed therein and a plurality of spherical balls disposed in the shaft.

9. The linear position transducer of claim 1, wherein the control head comprises:
   a wireless data receiver to receive position data from the read head;
   an output data driver to transfer the position data to an external device; and
   a microcontroller to coordinate a data transfer between the wireless data receiver and the output data driver.

10. The linear position transducer of claim 1, wherein the wirelessly-powered read head comprises:
    a wireless data transmitter to transmit position data to the control head; and
    a linear position sensor to sense position along the scale.

11. A method for generating a linear position measurement, comprising:
    wirelessly powering a read head to measure position along a scale; and
    wirelessly transmitting position data from the read head to a control head.

12. The method of claim 11, further comprising:
    distributing position data received by the control head to an external device.

13. The method of claim 11, wherein the wirelessly powering step comprises providing power to the read head via inductive energy transfer.

14. The method of claim 11, wherein the wirelessly powering step comprises providing power to the read head via RF energy transfer.

15. The method of claim 11, wherein the wirelessly powering step comprises providing power to the read head via vibrational energy from the read head moving along the scale.

16. A wireless read head for use in a linear position transducer, comprising:
    means for sensing a change in relative position between the read head and a scale and producing a position signal;
    means for transmitting the position signal; and
    means for wirelessly receiving energy from a remote source and for using the energy to power the sensing means and the transmitting means.

17. The wireless read head of claim 16, wherein said wirelessly receiving means comprises:
    means for receiving inductive energy.

18. The wireless read head of claim 16, wherein said wirelessly receiving means comprises:
    means for receiving RF energy.

19. The wireless read head of claim 16, wherein said wirelessly receiving means comprises:
    means for converting vibrational energy from the read head moving along the scale into useful energy.

* * * * *